July 18, 1967     W. RIEHL     3,331,601
HYDRO-PNEUMATIC SUSPENSION DEVICES
Filed June 28, 1965     3 Sheets-Sheet 1

Inventor
WILHELM RIEHL
By J.C. Evans
Attorney

July 18, 1967 W. RIEHL 3,331,601
HYDRO-PNEUMATIC SUSPENSION DEVICES
Filed June 28, 1965 3 Sheets-Sheet 3

Inventor
WILHELM RIEHL
By J.C. Evans
Attorney

United States Patent Office 3,331,601
Patented July 18, 1967

3,331,601
HYDRO-PNEUMATIC SUSPENSION DEVICES
Wilhelm Riehl, Raunheim am Main, Germany, assignor to General Motors Corporation, Detroit, Mich., a corporation of Delaware
Filed June 28, 1965, Ser. No. 467,421
Claims priority, application Germany, July 3, 1964, O 10,235
17 Claims. (Cl. 267—64)

This invention relates to hydro-pneumatic suspension devices, for example for use in motor vehicles.

The object of the suspension devices according to the invention is to combine, in a compact and self-contained unit, the functions of hydro-pneumatic suspension and damping, and self-regulating height adjustment.

The scope of the monopoly is defined by the appended claims; the invention and how it can be performed are hereinafter particularly described with reference to the accompanying drawings, in which:

Figure 1:
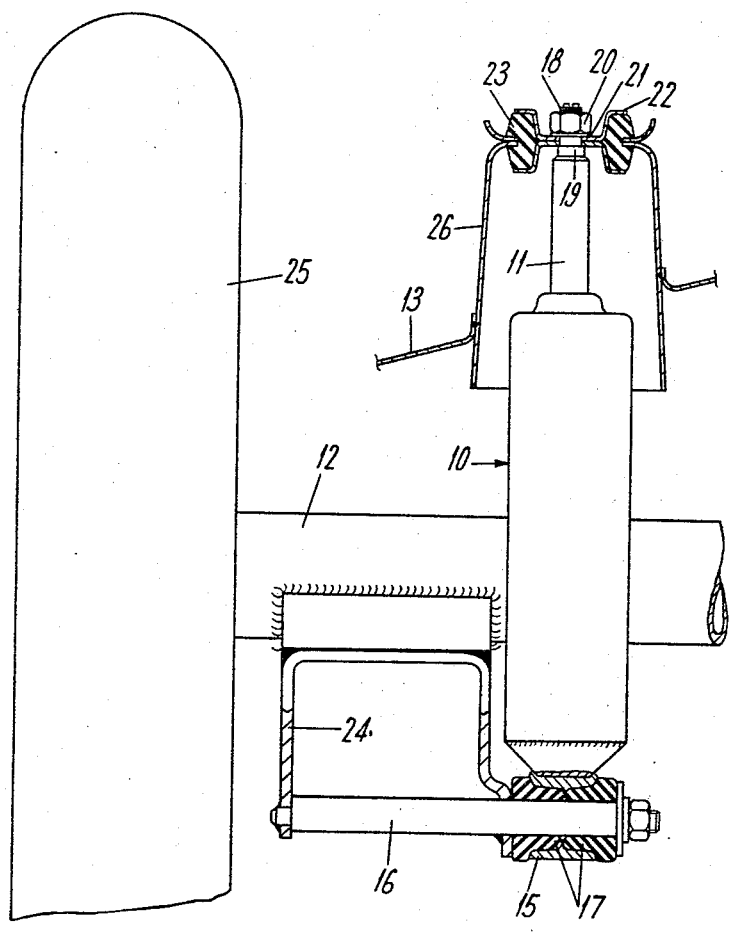
FIGURE 1 is a general view illustrating how a hydro-pneumatic suspension device according to the present invention can be interposed between a wheel axle and a frame or body of a motor vehicle.

As illustrated in FIGURE 1, a hydro-pneumatic suspension device comprises two relatively movable parts, namely an operating cylinder 10 and a damper rod 11, interposed between an axle tube 12 and a frame or body 13 of a motor vehicle. The operating cylinder 10 has an eye 15 secured to its bottom end, and a pin 16 passes through the eye with the interposition of annular rubber bushings 17. The pin 16 is secured to a bracket 24 welded to the axle tube 12, within which is an axle for a wheel 25 of the vehicle.

The upper end of the damper rod 11 includes a threaded end portion 18 and a collar portion 19. These, together with a nut 20 and washer 21, serve to hold two halves of a pressing 22 together to retain an annular rubber element 23.

Bell-shaped portions 26 are secured to the vehicle frame or body 13 and extend into the rubber element 23. In this way the device is connected to the vehicle frame or body by way of an articulated and sound-damping connection.

Figure 2:
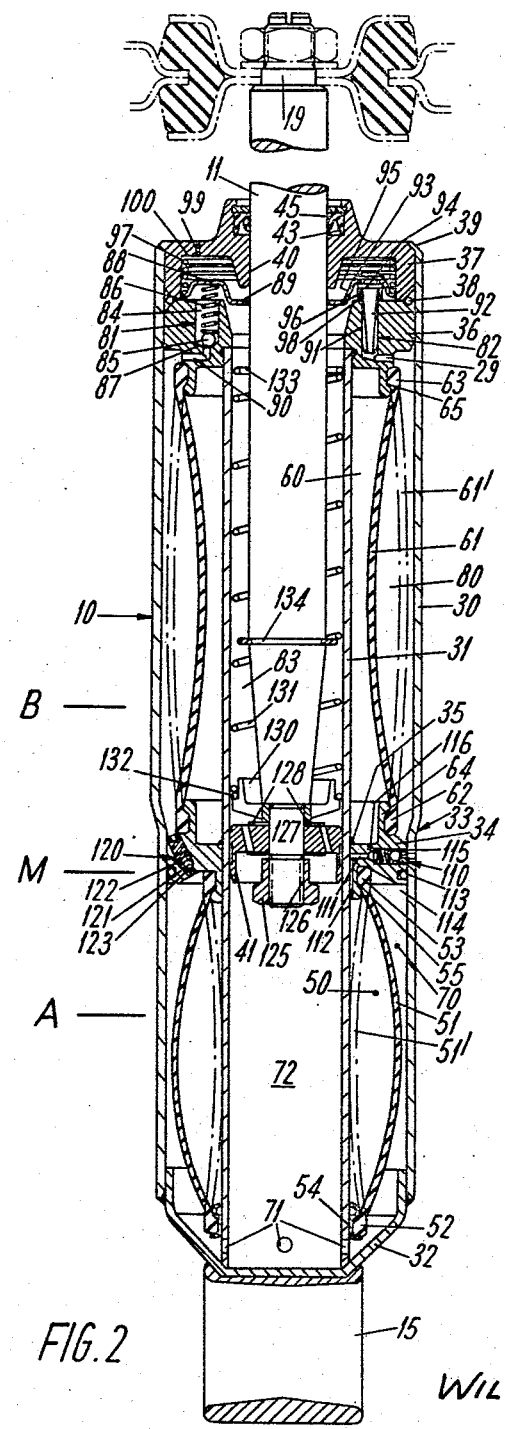
FIGURE 2 is a longitudinal section of one embodiment of a hydro-pneumatic suspension device according to the present invention.

As is shown in FIGURE 2, the operating cylinder 10 consists of an outer tube 30 and, concentrically within the outer tube, a damper tube 31. The lower end of the outer tube 30 is welded by way of a base cap 32 to the eye 15. The base cap acts as a guide for the damper tube 31.

In an intermediate region between the outer tube 30 and the damper tube 31, a partition 34 is pressed in from above and is welded to the damper tube 31 at 35. To facilitate assembly of the partition, the outer tube 30 is narrowed at 33. At the upper end of the device, a valve plate 36 and a cover 37 serving as an external closure are pressed into the outer tube 30 between this tube and the damper tube 31 to firmly interconnect the two tubes, a sealing ring 38 being interposed between the cover and the valve plate. The upper edge portion of the outer tube 30 is flanged over the cover 37 with an internal flange 39.

The damper rod 11 protrudes through the cover 37 and is guided in the cover by a bearing 40 and in the damper tube 31 by a damper piston 41. A high-pressure seal 45 is positioned between the damper rod 11 and the cover 37 in a groove 43 in the cover.

The device includes two pneumatic springs. The first of these, an operating pneumatic spring 50, is situated between the lower half of the damper tube 31 and an annular operating diaphragm 51. The diaphragm 51 comprises a flexible tubular member made of elastic material, in this instance rubber, with its lower and upper edges shaped into beads 52 and 53. The lower bead 52 is seated in a sheet-metal pressing 54 forced on to the damper tube 31, and the upper bead 53 is seated in a groove 55 in the partition 34.

The second of the pneumatic springs, a control pneumatic spring 60, is situated above the partition 34, between the upper half of the damper tube 31 and an annular control diaphragm 61. Like the operating diaphragm 51, the control diaphragm comprises a flexible tubular member made of elastic material with its lower and upper edges shaped into beads 62 and 63. The lower bead 62 is seated in a groove 64 of the partition 34 and the upper bead 63 is seated in a groove 65 of the valve plate 36.

The space between the operating diaphragm 51 and the outer tube 30 forms an operating-fluid space 70, which communicates via large holes 71 in the damper tube 31 with a lower damping space 72 within the damper tube 31 and below the damper piston 41.

The space between the control diaphragm 61 and the outer tube 30 forms a control-fluid space 80 which communicates by way of an inflow control valve 81 and an outflow control valve 82 with the upper damping space 83 which is situated above the damper piston 41. The inflow and outflow control valves 81 and 82 are accommodated in the valve plate 36.

The inflow control valve 81 comprises a bore 84 containing a ball 85 which is biased on to a seat 87 by a helical spring 86 seated in a cup-shaped trough 88 in a valve plate 89. The inflow control valve 81 is also in communication with the control-fluid space 80 by way of an aperture 90.

The outflow control valve 82 comprises a bore 91 into which a conically-surfaced pin 92 projects. This pin 92 is secured by means of two washers 93 and 94 in a cup-shaped depression 95 of the valve plate 89. The outflow control valve 82 also includes a packing ring 96.

The bore 91 is in communication with the control-fluid space 80 via a connecting passage 29. The valve plate 89 is continuously biased by an outflow control counter-spring 97 which forces the packing ring 96 of the outflow control valve 82 on to a sealing face 98 and is stronger than the helical spring 86.

The conical surface of the pin 92 ensures that, with increasing valve lift, an increasingly large flow cross-section is opened. The damper piston 41 contains through passages 127 which connect the lower and upper damping spaces 72 and 83 to each other and are covered over at both sides by spring plates 128 to produce damping forces at the damper rod 11 during movement of the damper piston 41.

The operating-fluid space 70, the lower and upper damping spaces 72 and 83, and the control-fluid space 80 are filled with a hydraulic damper fluid, which is introduced through an aperture 99 in the cover 37. A plate 100 of synthetic elastomeric material (or rubber could be used) seals off the aperture 99 from the inside. When the damper piston 41 is stationary, the same pressure prevails in the operating-fluid space 70 and in the upper and lower damping spaces 83 and 72. The operating pneumatic spring and the control pneumatic spring are filled with air or another gas, for example nitrogen.

The various pressures may be equal, or may be different if this meets the requirements of use and fitting. In the main, the pressures chosen depend upon the load intended to be carried by the device.

The load-carrying power of the device is derived from the pressures in the damping spaces 83 and 72, or in other words from the pressure of the operating pneumatic spring 50 multiplied by the cross-sectional area of the damper rod 11. The larger the diameter of the damper rod 11, the smaller can be the pressure chosen for the operating pneumatic spring 50. Broadly, there are three characteristic positions M, A and B of the damper piston 41 relative to the operating cylinder 31, as follows:

Position M is the position (illustrated in FIGURE 2) which is automatically assumed by the damper piston 41 whilst the vehicle is travelling, after being loaded or unloaded (median or normal position);

Position A is the position which the damper piston 41 assumes under the influence of the maximum design load, whilst the vehicle is stationary after being loaded (low position); and Position B is the position which the damper piston 41 assumes whilst the vehicle is stationary after being unloaded (high position).

In the specific embodiment shown in FIGURE 2, gas may be introduced from the outside into the operating pneumatic spring 50 through a valve 110 located in the partition 34, and thence through bores 111 and 112. The valve 110 consists of a ball 113 which is biased by the action of a helical spring 114 on to a seat 115 constituted by a plug of plastics material.

A similar valve (not shown because it is in another plane) is provided to allow the control pneumatic spring 60 to be filled through a bore 116 indicated in dotted lines.

The partition 34 contains a compression stroke limit valve 120 which consists of a ball 121 resiliently biased by a helical spring 122 on to a seat 123. The helical spring allows the valve 120 to open as soon as a design pressure is exceeded in the operating-fluid space 70.

The damper piston 41 is secured to the damper rod 11 by means of a nut 125 which engages a threaded end portion 126 of the damper rod. Oscillation of the damper piston 41 to and fro causes fluid to flow in alternate directions through the passages 127 and, depending on the calibration of the latter, the shape and thickness of the spring plates 128 and the speed of the damper piston 41, to produce a pressure difference between the two sides of the piston. The flow resistance of the passages 127 gives a damping effect.

For some applications of the device, this damping effect may be different for the two directions of movement of the damper piston 41. A different construction from that illustrated may be chosen for the damper piston; for example the piston may have valves of a different type, or the piston may be slidably mounted on the damper rod.

A holder 130 for a helical outflow control spring 131 is a force fit on the damper rod 11 above the damper piston 41, the lower end 132 of the helical spring 131 being firmly connected to this holder 130, whereas the upper end 133 of the spring is free.

A stop 134 is secured to the damper rod 11: when the damper rod moves upwards (during the extension stroke of the device), the stop 134 first engages the valve plate 89 and then carries the valve plate along until it strikes a stop portion 40 of the cover 37.

The operation of the device shown in FIGURE 2 is as follows:

The damper piston 41 will be assumed to be initially in the position M as illustrated. In this position the operating diaphragm 51 and the control diaphragm 61 assume approximately the shapes shown in full lines. If the vehicle is then loaded, the damper piston 41 travels downwards and reaches the position A when the vehicle is fully laden. In this condition, the pressures in the upper and lower damping spaces 83 and 72, and the pressure of the operating pneumatic spring 50, are somewhat increased.

When the vehicle is moving, the damper piston 41 makes upward and downward oscillations, and acts as a shock absorber. At the same time, pressure differences arise between the upper and lower damping spaces 83 and 72. If the pressure in the upper damping space 83 becomes less (during the compression stroke) than that in the control-fluid space 80, the inflow control valve 81 opens and fluid flows from the control-fluid space 80 into the upper damping space 83. As soon as the pressure in the upper damping space 83 becomes greater (during the extension stroke), the inflow control valve 81 closes, and fluid enters the lower damping space 72 through the passages 127 in the damper piston 41. The oscillatory movement of the device leads to an increased pressure in the damper tube 31 and in the operating pneumatic spring 50, so producing a greater spring effort for raising the damper rod 11 and therefore lifting the vehicle. The succeeding oscillations whilst the vehicle is travelling continue this action, although to a progressively lesser degree, until the damper piston 41 has again reached the median position M. In the meantime the operating diaphragm 51 and the control diaphragm 61 have assumed the shapes 51' and 61' indicated in interrupted lines. The inflow control valve 81 is so dimensioned that, even with very violent compression strokes resulting from the damper piston 41 moving at high speed, the valve is still able to allow fluid to flow from the control-fluid space 80 into the upper damping space 83.

As soon as the pressure in the lower damping space 72 exceeds the design value, especially under the influence of shock-like compression movements, the compression stroke limiting valve 120 opens, with the result that fluid can pass from the operating-fluid space 70 into the control fluid space 80.

The compression stroke limiting valve could alternatively be located in the damper piston 41.

If the vehicle is then unloaded, the damper piston 41 travels upwards and reaches the position B when the vehicle is completely relieved of load. The pressures in the upper and lower damping spaces 83 and 72, and the pressure of the operating pneumatic spring 50, thereby fall somewhat. During unloading, the upper end 133 of the hitherto unstressed outflow control spring 131 engages the valve plate 89 and lifts the valve plate in opposition to the bias of the outflow control counter-spring 97. The packing ring 96 of the outflow control valve 82 is thereby lifted from its seat, with the result that fluid flows from the upper damping space 83 back into the control-fluid space 80, so tensioning the control pneumatic spring 60 again and allowing the operating diaphragm 51 and the control diaphragm 61 to return to the respective shapes indicated in full lines.

Because the surface of the pin 92 is conical, the return flow action takes place progressively; in other words, for greater extension strokes the return flow action is accelerated, especially if the damper piston 41 moves upwards beyond the position B.

Figure 3:
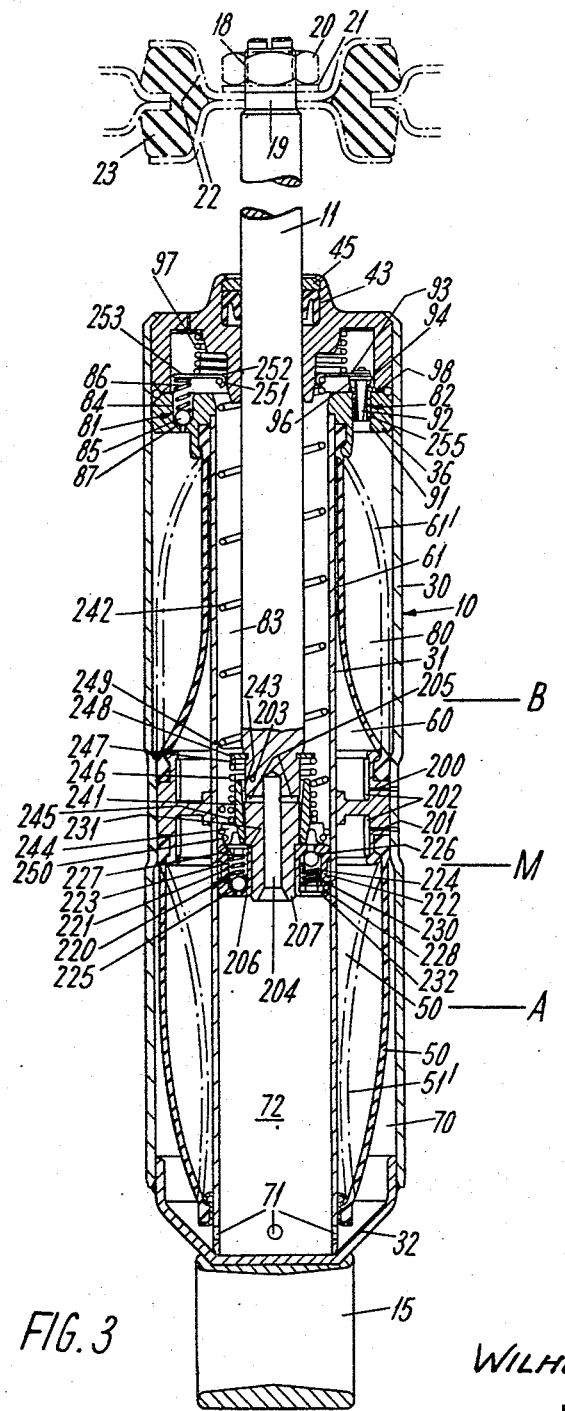
FIGURE 3 is a longitudinal section of a modified embodiment of a hydro-pneumatic suspension device according to the present invention.

The embodiment of the hydro-pneumatic suspension device shown in FIGURE 3 is of very similar construction to that shown in FIGURE 2; identical or similar parts are accordingly designated with like reference numerals, and the following description deals mainly with the parts which are of different construction.

In the embodiment shown in FIGURE 3, the operating pneumatic spring 50 and the control pneumatic spring 60 are filled through bores 200 and 201 respectively. Flexible tubes 202 seal the insides of the bores 200 and 201. A lower tapered end 203 of the damper rod 11 contains a longitudinal bore 204 with which transverse bores 205 communicate, to place the upper and lower damping spaces 83 and 72 in communication with each other. A damper piston 206 is secured to the damper rod 11 by means of a chamfered flange connection 207 at the lower end of the longitudinal bore 204. The damper piston 206 contains two valves, namely a compression stroke limit valve 220 and an extension stroke limit valve 230. Both valves are of identical construction and include respective balls 221 and 222 which are resiliently biased by helical springs 223 and 224 towards respective seats 225 and 226. The springs are seated on washers 227 and 228 which are held in place by flanged edges 231 and 232. When the damper piston 206 oscillates to and fro, fluid flows in alternate directions through the longitudinal and transverse bores 204 and 205, and, depending upon the calibration of the latter and the speed of the damper piston 206, a pressure difference arises between the two sides of the piston, as already explained in detail. An annular slider 241 is mounted in a longitudinally displaceable manner on the tapered end 203 of the damper rod 11. The slider 241 is subject to the bias of an outflow control spring 242, and has a conical internal surface 243. Three arms 244 (or more) are mounted on the external surface of the annular slider 241, and form a seat for the lower end 245 of a helical spring 246. The upper end 247 of the helical spring 246 is seated on a ring 248 which abuts a shoulder portion 249 of the damper rod 11. In the indicated position of the annular slider 241, flow through the transverse bores 205 is slightly impeded, and the annular slider 241 moves upwards with respect to the damper rod 11, the transverse bores 205 are increasingly covered over, as the result of the conical shape of the internal surface 243, whereby the flow of fluid through the bores is impeded.

The lower end 250 of the outflow control spring 242 is secured to the arms 244 of the annular slider 241, and its upper end 251 is secured to a valve plate 253 by means of a flange 252. The outflow control valve 82 in the valve base 36 consists of a bore 91 into which a valve sleeve 255 is pressed. Protruding into the latter is a conically-surfaced pin 92 which is secured to the valve plate 253 by means of two washers 93 and 94. The valve plate 253 is constantly biased in a downward direction by the outflow control counter-spring 97, with the result that packing ring 96 of the outflow control valve 82 is forced on to the sealing face 98 at the valve sleeve 255.

The conical surface of the pin 92 ensures that, with increasing valve lift, an increasingly large flow cross-section is opened. It would alternatively be possible for a cylindrical pin having conical face portions to be used.

The inflow control valve 81 consists of a bore 84 containing a ball which is biased on to its seat 87 by means of a helical spring 86 seated on the valve plate 253. The spring effort of the helical spring 86 is less than that of the outflow control counter-spring 97.

The mode of operation of the device shown in FIGURE 3 is as follows:

The damper piston 206 will be assumed to be initially in the position M as illustrated. In this position the operating diaphragm 51 and the control diaphragm 61 assume approximately the shapes shown in full lines.

If the vehicle is then loaded, the damper piston 206 travels downwards and reaches the position A when the vehicle is fully laden. In this condition, the pressures in the upper and lower damper spaces 83 and 72, and the pressure of the operating pneumatic spring 50, are somewhat increased.

The previously unstressed outflow control spring 242 is thereby tensioned, and moves the annular slider 241 in opposition to the action of the helical spring 246, with the result that the transverse bores 205 are partially covered and the flow cross-section is reduced.

When the vehicle is moving, the damper piston 206 makes upward and downward oscillations, and acts as a shock absorber. At the same time, pressure differences arises between the upper and lower damper spaces 83 and 72. If the pressure in the upper damper space 83 becomes less (during the compression stroke) than that in the control-fluid space 80, the inflow valve 81 opens and fluid flows from the control-fluid space 80 into the upper damping space 83. Owing to the reduced flow cross-section at the transverse bores 205, the damping action becomes greater as the compression stroke proceeds. Also, the pressure in the upper damping space 83 rapidly decreases as the compression stroke proceeds, and as a result the inflow control valve 81 opens early, so that a large amount of fluid is able to flow from the control-fluid space 80 into the upper damping space 83.

Therefore the first oscillatory movements are sufficient to allow the device to lift the vehicle body rapidly, and the further the damper piston 206 passes downwards, the greater is the lifting effect produced by the device.

As soon as the pressure in the upper damping space 83 becomes greater (during the extension stroke), the inflow control valve 81 closes, whilst fluid passes into the lower damping space 72 through the bores 205 and 204 in the damper piston 206.

As a result, there is a rapid increase in the pressure in the damper tube 31, and in the pressure of the operating pneumatic spring 50. The succeeding oscillations whilst the vehicle is travelling continue this action, although to a progressively lower degree, until the damper piston 206 has again reached the median position M. At full loading the operating diaphragm 51 and the control diaphragm 61 assumed approximately the shapes indicated by the interrupted lines 51' and 61'.

The inflow control valve 81 is so dimensioned that, even with very violent compression strokes resulting from the damper piston 206 moving at high speed, the valve is still able to allow fluid to flow from the control-fluid space 80 into the upper damping space 83.

As soon as the pressure in the lower damping space 72 exceeds the design value, under the infuence of especially violent shock-like compression movements, the compression stroke limit valve 220 opens, with the result that fluid can pass from the lower damping space 72 into the upper damping space 83.

If on the other hand the pressure in the upper damping space 83 exceeds the design value during particularly violent extension stroke movements, the extension stroke limit valve 230 opens.

If the vehicle is then unloaded, the damper piston 206 travels upwards and reaches the position B when the vehicle is completely relieved of load. The pressures in the upper and lower damping spaces 83 and 72, and the pressure of the operating pneumatic spring 50, thereby fall somewhat. The outflow control spring 242 acquires compressive stresses and lifts the valve plate 253 in opposition to the effort of the outflow control counter-spring 97, whereby the packing ring of the outflow control valve 82 is lifted from its seat and consequently fluid can flow back from the upper damping space 83 into the control-fluid space 80, so tensioning the control pneumatic spring 60 and allowing the control diaphragm 61 to return to the shape indicated in full lines in the drawing. On account of the conical surface of the pin 92, the return flow action takes place progressively, and is accelerated with large extension strokes. The result is that the further the damper piston 206 moves upwards, the more quickly does the device lower the vehicle body. Here again, this action may take place even at the first oscillatory movement, if the vehicle rolls severely on a bend.

The embodiment shown in FIGURE 3 gives a particularly rapid response to sudden changes in loading, as is highly desirable to allow S-bends to be negotiated without detrimental lurching of a vehicle equipped with the device.

Both the described embodiments of hydro-pneumatic suspension devices according to the invention are relatively simple, light in weight and inexpensive, having regard to the functions they perform, and are inherently reliable in operation. The compact configuration of the devices, making them highly suitable for use in motor vehicles, can be seen from FIGURE 1.

I claim:

1. A hydro-pneumatic suspension device comprising an operating cylinder, a damper tube disposed coaxially within the operating cylinder, a damper piston slidably received within the damper tube, a damper rod having one end connected to the damper piston and the other end projecting from the operating cylinder, an operating-fluid space between the operating cylinder and the damper tube, an operating pneumatic spring arranged to provide a controlled hydraulic pressure in the operating-fluid space, a fluid connection between the operating-fluid space and a space within the damper tube on axial side of the damper piston remote from the damper rod, a control-fluid space between the operating cylinder and the damper tube, a control pneumatic spring arranged to provide a controlled hydraulic pressure in the control-fluid space, an inflow one-way valve connected between the control-fluid space and a space within the damper tube surrounding the damper rod, an outflow control valve connected between the control-fluid space and the space within the damper tube surounding the damper rod, and an outflow valve control device responsive to the axial position of the damper rod.

2. A hydro-pneumatic suspension device according to claim 1, wherein the outflow control device comprises a helical control spring which surrounds a portion of the damper rod between the damper piston and the outflow control valve and is unstressed in a median position of the damper piston but opens the outflow control valve during an extension stroke of the device.

3. A hydro-pneumatic suspension device according to claim 2, wherein the outflow control valve gives a greater flow cross-section for large extension strokes of the device than for small extension strokes.

4. A hydro-pneumatic suspension device according to claim 2, wherein the outflow control device also includes a valve plate which surrounds the damper rod and is engageable by one end of the helical control spring to open the outflow control valve against the action of a counterspring.

5. A hydro-pneumatic suspension device according to claim 4, wherein the valve plate also forms a seat for a compression spring which resiliently biases the inflow control valve to a closed position.

6. A hydro-pneumatic suspension device according to claim 4, wherein the damper rod carries a stop which engages the valve plate during large extension strokes of the device.

7. A hydro-pneumatic suspension device according to claim 2, wherein the outflow control device also includes a valve plate which surrounds the damper rod and is connected to one end of a helical control spring to open the outflow control valve against the action of a counterspring.

8. A hydro-pneumatic suspension device according to claim 7, wherein the valve plate also forms a seat for a compression spring which resiliently biases the inflow control valve to a closed position.

9. A hydro-pneumatic suspension device according to claim 7, wherein the other end of the helical control spring is connected to an annular slider which surrounds a part of the damper rod adjacent the damper piston for progressively varying the flow cross-section across the damper piston.

10. A hydro-pneumatic suspension device according to claim 9, wherein the annular slider has a conical internal surface.

11. A hydro-pneumatic suspension device according to claim 9, wherein the annular slider is subject to a resilient bias.

12. A hydro-pneumatic suspension device according to claim 11, wherein the annular slider gives a maximum flow cross-section between a median position and an extended position of the device, and progressively decreases the flow cross-section in a region between the median position and a compressed position of the device.

13. A hydro-pneumatic suspension device according to claim 1, wherein a one-way compression stroke limit valve is mounted in an annular partition between the operating-fluid space and the control-fluid space.

14. A hydro-pneumatic suspension device according to claim 1, wherein a one-way compression stroke limit valve is mounted in the damper piston.

15. A hydro-pneumatic suspension device according to claim 14, wherein a one-way extension stroke limit valve is also mounted in the damper piston.

16. A hydro-pneumatic suspension device comprising an operating cylinder, a damper tube disposed coaxially within the operating cylinder, a damper piston slidably received within the damper tube, a damper rod having one end connected to the damper piston and the other end projecting from the operating cylinder, and the following all disposed within the confines of the operating cylinder:
(a) an operating-fluid space between the operating cylinder and the damper tube;
(b) an operating pneumatic spring arranged to provide a controlled hydraulic pressure in the operating-fluid space;
(c) a fluid connection between the operating-fluid space and a space within the damper tube on the axial side of the damper piston remote from the damper rod;
(d) a control-fluid space between the operating cylinder and the damper tube;
(e) a control pneumatic spring arranged to provide a controlled hydraulic pressure in the control-fluid space; and
(f) an inflow one-way valve connected between the control-fluid space and a space within the damper tube surrounding the damper rod.

17. A hydro-pneumatic suspension device according to claim 16, connected between a wheel axle and a frame or body of a motor vehicle.

References Cited

UNITED STATES PATENTS 3,094,317  6/1963  Axthammer.
3,110,485  11/1963  Axthammer.

ARTHUR L. LA POINT, *Primary Examiner.*

R. M. WOHLFARTH, *Assistant Examiner.*